Patented June 19, 1951

2,557,834

UNITED STATES PATENT OFFICE 2,557,834

REFRACTORY GLASS WOOL

John C. McMullen, Niagara Falls, N. Y., assignor to The Carborundum Company, Niagara Falls, N. Y., a corporation of Delaware No Drawing. Application February 23, 1949, Serial No. 78,011

15 Claims. (Cl. 106—50)

This invention relates to glass compositions, and particularly to glass in fibrous form suitable for use as an insulating material and the like at high temperatures, and to compositions for making the same.

The manufacture of fibrous glass, otherwise commonly known and referred to as glass wool, is not new. Such products have heretofore been made from various metallurgical slags or from natural raw materials which have usually been of a calcareous or dolomitic base composition. The resulting products are sometimes called slag wool or rock wool, depending upon the origin of the raw materials. Such products have proven quite satisfactory for many insulating and filtering purposes where high temperatures have not been involved. However, from the very nature of the raw materials used the fibrous glass products of the prior art have not been of sufficiently refractory character to permit their use at very high temperatures. The product loses its original strength and resilience, becomes brittle and friable, and crumbles into small fragments whenever subjected to vibration or other mechanical shock or disturbance. Obviously, such behavior destroys almost entirely its value as an insulating material. The fibrous glass compositions heretofore available have, therefore, been entirely unsatisfactory for insulation at high temperatures.

There has been a demand for a long time for a glass in finely fibrous form which would be sufficiently refractory to retain its strength and resiliency to a substantial degree when subjected to temperatures in the neighborhood of 2500° F. (1372° C.) or higher over protracted periods of time. Obviously, the melting point of such a fibrous glass must be above 2500° F. Furthermore, a fibrous glass suitable for use as a glass wool insulating or filtering medium should preferably have a maximum fiber diameter of 10 microns and a fiber length of at least ½" in order to provide it with the flexibility and resilience needed for felting or otherwise fabricating it into bats and other forms for insulative purposes or as a filter medium. The compositions from which the glass wool is made should also be such that it can be readily and economically fabricated in commercially practical quantities into fibers meeting the above requirements.

It is an object of the present invention to provide a glass composition in fibrous form which will be of sufficient refractoriness and have the properties required for use at temperatures of 2500° F. and above.

It is also an object of the present invention to provide raw batch compositions from which products of the desired type can be readily and economically made.

I have found that refractory glass compositions in suitable fibrous form for use at high temperatures can be obtained by melting and fiberizing mixtures of alumina and silica containing a small amount of a modifying agent such as borax glass. A highly satisfactory composition in accordance with the present invention is one containing 50 parts by weight of alumina, 50 parts by weight of silica and 1½ to 2 parts by weight of borax glass. However, satisfactory fibrous glass can be produced when the $Al_2O_3/SiO_2$ ratio is maintained within the range of 45–55 parts by weight of alumina to 55–45 parts by weight of silica. When the amount of alumina is increased to an amount above the ratio of 55 parts of alumina to 45 parts of silica, pellets are formed instead of fibers when the molten material is subjected to any of the usual fiberizing treatments. On the other hand when the amount of alumina is decreased to an amount below the ratio of 45 parts by weight of alumina to 55 parts by weight of silica the fibers formed when the molten material is subjected to a fiberizing action are too coarse to give a satisfactorily resilient or flexible material. The borax glass or other modifying agent should always be present in the raw batch compositions in amounts of 1½ to 6 parts by weight to every 100 parts by combined weight of alumina and silica. As much as 7½% of the silica can be replaced by zirconia without detracting appreciably from the quality or quantity of fibrous glass obtained.

Otherwise, I have found that the presence of certain specific minor ingredients as well as the absence of other unwanted impurities in the compositions from which the fibrous glass is made is highly critical to the control of both the quality and quantity of the product obtained. The presence of some and absence of other minor ingredients not only affect to a large extent the ability of the resulting product to resist temperatures in the neighborhood of 1300 to 1400° C., but determines whether a fibrous material of acceptable fineness and fiber length will be obtained as well as the quantity of fibrous material yielded. It is therefore essential that the correct amount of borax glass or other modifying agent be added to the raw batch from which the melt is made or be otherwise included in the molten bath from which the fibers are formed prior to the fiberizing operation. At the same time it is essential that there be excluded from the bath such minor ingredients or impurities as interfere with or prevent the formation of fibrous material in satisfactory quantity or of acceptable quality. For that reason, the raw materials used for making fibrous glass compositions of the present invention should be relatively pure and free from impurities other than small amounts of alkaline oxides.

One satisfactory source of alumina for carrying out the present invention is that sold by the Aluminum Company of America as tabular alumina designated as T-61 and having the following composition:

| | Percentage |
|---|---|
| $Al_2O_3$ | 99.5+ |
| $SiO_2$ | .02 |
| $Na_2O$ | .02 |
| $Fe_2O_3$ | .03 |
| $TiO_2$ | .005 |

A less expensive source of alumina which has been found satisfactory for present purposes is that sold by the Aluminum Company of America as A-1 grade white alumina ore of which the following is a typical chemical analysis:

| | Percentage |
|---|---|
| $Al_2O_3$ | 98.89 |
| $SiO_2$ | .03 |
| $Na_2O$ | .55 |
| $Fe_2O_3$ | .03 |
| $TiO_2$ | .004 |
| $H_2O$ (combined) | .50 |
| $H_2O$ (free) | 1.25 |

The source material for silica may be either a high purity flint or white sand.

It has been my experience, however, that kaolin or other clays even though of relatively high purity are not satisfactory as a source of the alumina and silica for making the fibrous refractory glass of the present invention, apparently because of the presence of certain impurities such as iron oxides, titania, alkaline earths or the like, contained in such raw materials.

I have consistently obtained most satisfactory results in respect of both the quality and the quantity of fibrous glass obtained when from 1½ to 6 parts by weight of borax glass ($Na_2B_4O_7$) to every 100 parts by combined weight of $Al_2O_3$ and $SiO_2$ has been used. Borax ($Na_2B_4O_7 \cdot 10H_2O$) can be used in place of borax glass ($Na_2B_4O_7$) providing the amount by weight is within the range of 2.84 parts by weight to 11.36 parts by weight to compensate for the 10 molecules of water of crystallization present in the borax. The full effect of adding borax glass or borax to the raw batch can also be obtained by using an alumina such as the A-1 grade of alumina referred to above, containing a small percentage of sodium oxide impurity, together with the addition of boric oxide, and if necessary, a small additional amount of soda ash or other comparable source of sodium oxide, to provide in the batch an amount of both sodium oxide and boric oxide equivalent to that provided by the use of 1½ to 6 parts of borax glass. When boric oxide and a source of an alkali oxide such as $Na_2O$ are used jointly the combined amounts of alkali and boric oxide should be no more than 10% by weight of the mass and preferably less than 6% by weight.

Although I prefer to use borax glass as the modifying agent due to the consistently good results obtained therewith, I have been able to obtain, within certain limitations, reasonably acceptable results by the employment of certain other specific materials. Although the resulting products may not always be as resistant to breakdown at temperatures in the range of 1300–1400° C. as the fibrous glass obtained when borax glass is used, they represent a decided improvement over other fibrous glass materials heretofore available. However, as with the use of borax glass, the use of these other modifying agents must be accompanied by the exclusion of any appreciable amounts of objectionable impurities such as titanium compounds, iron oxides and the like. Among the materials which I have found highly satisfactory, although of somewhat limited application, are aluminum chloride, sodium carbonate, potassium chloride, potassium fluoride, potassium phosphate and zinc oxide. Best results, especially with respect to the quantity or yield, are obtained when these materials are used in the presence of a small amount of sodium oxide such as that provided as an impurity in an alumina such as the A-1 grade of alumina hereinabove set forth.

In order that the invention may be more clearly understood, the following examples are given of compositions from which a high quality fibrous glass in substantial quantity can be readily made.

*Example I*

A raw batch of the following composition is prepared:

| | Parts by weight |
|---|---|
| A-1 grade white alumina ore | 50 |
| Flint | 50 |
| Borax glass ($Na_2B_4O_7$) | 1½ |

The above composition after thorough mixing is fused in an arc furnace of the type commonly used for making alumina abrasive materials until a substantial bath of molten material is obtained. The furnace is then tilted to allow the molten material to pour from the furnace in the form of a small stream which is struck at substantially right angles thereto by a stream of compressed air at 80 pounds per square inch pressure. The stream of molten material is dissipated in the form of fine fibrous glass which is collected upon a ¼" mesh screen placed in front of the furnace about 5 feet away. The resulting fibrous glass, after the removal of any pelletized material, is ready for fabrication into bats or may be packaged and shipped for use in loose or otherwise fabricated form.

The following is a typical chemical analysis of the resulting fibrous glass:

| | Per cent |
|---|---|
| $Al_2O_3$ | 52.67 |
| $SiO_2$ | 45.77 |
| $B_2O_3$ | 1.06 |
| $Na_2O$ | .50 |

The fibrous glass obtained in accordance with Example I has a fiber diameter of 2–10 microns, the individual fibers being substantially greater than ½" in length. The resulting glass wool is highly refractory in character at temperatures of as high as 1400° C. over protracted periods of time. As a test to demonstrate the ability of the fibrous glass to resist breakdown at elevated temperatures over extended periods of time small mounds of the resulting fibrous glass approximately 2" in diameter and 1" high were placed on a bonded silicon carbide slab coated with a flint wash 1/16" thick, put in an electrically heated furnace and held at a temperature of 1400° C. for 24 hours. Examination of the glass upon cooling after the test showed that it had stood up under the test and in large measure had retained its springiness or resilience.

*Example II*

A raw batch of the following composition has also been found satisfactory for the making of fibrous glass in accordance with the present invention, the procedure followed being the same as that set forth for Example I above.

| | Parts by weight |
|---|---|
| A-1 grade white alumina ore | 50 |
| Flint | 50 |
| Boric oxide | 1.0 |
| Soda ash | 1.0 |

The amount of boric oxide when A-1 grade white alumina ore or equivalent source of alumina containing an alkali oxide is used, if desired, can be varied between 1 and 5 per cent by weight of the mass and the amount of added soda ash or other equivalent source of sodium oxide can be varied to provide between 0 and 3 per cent by weight of the mass of sodium oxide.

*Example III*

The following composition is satisfactory for making a fibrous glass of satisfactory refractory quality and in suitable quantity. The procedure followed is the same as that given for the previous examples:

| | Parts by weight |
|---|---|
| A-1 grade white alumina ore | 50 |
| Flint | 42½ |
| Zirconia | 7½ |
| Borax glass | 2 |

*Example IV*

The following composition is satisfactory for making a fibrous glass intended for use at temperatures of 1300° C. or lower. It is not as resistant to breakdown as the fibrous glass of the previous examples, but is sufficiently resistant to breakdown to permit use under less severe temperature conditions.

| | Parts by weight |
|---|---|
| A-1 grade white alumina ore | 50 |
| Flint | 50 |
| Soda ash ($Na_2CO_3$) | 3.5 |

The refractory fibrous glass compositions of the present invention in either bulk form or fabricated in the form of batts, cloth, tapes, sleevings or cordage are not only highly suited for various high temperature insulating purposes, including insulation in furnaces and other industrial high-temperature equipment, insulation blankets for jet engines and rockets, but also are highly satisfactory as a filtering medium for filtering high temperature and/or corrosive gases or liquids. It can also be satisfactorily used in other miscellaneous applications, such as a resilient and compressible refractory packing for expansion joints and areas, or cracks between rigid or solid members to prevent entry of undesired solid materials into the joints or cracks or retard gas leakage.

Having described the invention in detail, it is desired to claim:

1. A glass wool consisting essentially of alumina and silica in substantially equal proportions and containing boric oxide and an alkali oxide totaling less than 10 per cent by weight of the mass.

2. A glass wool, the fibers of which are composed essentially of, by oxide analysis, alumina, silica, boric oxide and an alkali oxide with the alumina and silica amounting to at least 94% by weight of the fibers, the individual fibers having a maximum diameter of 10 microns and being resistant to breakdown at a temperature of 1400° C. over a period of 24 hours.

3. Glass in fibrous form having a composition comprising alumina, silica, boric oxide and an alkali oxide, the alumina and silica constituting at least 94% by weight of the mass and being in substantially 1:1 proportion.

4. Glass in fibrous form having a composition according to claim 3 in which up to 7½% by weight of the silica is replaced by zirconia.

5. Glass in fibrous form having a composition comprising alumina, silica, boric oxide and sodium oxide, the alumina and silica constituting at least 94% by weight of the mass and being in substantially 1:1 proportion, the boric oxide and sodium oxide being present in substantially the proportions to one another in which they exist in borax glass.

6. Glass in fibrous form having a composition comprising alumina, silica, boric oxide and an alkali oxide, the alumina and silica constituting at least 94% by weight of the mass and being in substantially 1:1 proportion, the remainder being substantially all boric oxide and an alkali oxide in substantially the molar proportions of the sodium oxide and boric oxide in borax glass.

7. Glass in fibrous form composed principally of alumina and silica in substantially equal parts by weight and containing 1 to 5% boric oxide and 0.5 to 3% of an alkaline oxide.

8. Glass in fibrous form having a composition in which the alumina/silica proportions are within the limits of 45 to 55 parts by weight of alumina to 55 to 45 parts by weight of silica, said composition also containing boric oxide and alkali oxides up to 6% by weight of the mass.

9. Glass in fibrous form composed principally of alumina and silica in substantially equal parts by weight and containing a sufficient amount of boric oxide and alkaline oxide to render the glass fibers resistant to breakdown at 1400° C.

10. A raw batch for making glass wool comprising 45 to 55 parts by weight of alumina, 55 to 45 parts by weight of silica, and 1½ to 6 parts by weight of borax glass.

11. A raw batch for making glass wool comprising 50 parts by weight of alumina, 50 parts by weight of silica and 1½ to 6 parts by weight of borax glass.

12. A raw batch for making glass wool comprising 45 to 55 parts by weight of alumina, 55 to 45 parts by weight of silica, and compounds of boron and sodium to provide the equivalent of 1½ to 6 parts by weight of borax glass.

13. A raw batch for making glass wool comprising 45 to 55 parts by weight of alumina, 55 to 45 parts by weight of silica, 1 to 5 parts by weight boric oxide and .5 to 5 parts by weight of soda ash.

14. Glass in fibrous form composed principally of alumina and silica in substantially equal parts by weight and containing 1½ to 6% by weight of a modifying agent.

15. A raw batch for making glass wool comprising 45–55 parts by weight of alumina, 55–45 parts by weight of silica, and 1½ to 6 parts by weight of a modifying agent selected from the group consisting of borax glass and compounds of boron and sodium equivalent thereto.

JOHN C. McMULLEN.

REFERENCES CITED

The following references are of record in the file of this patent:

UNITED STATES PATENTS

| Number | Name | Date |
|---|---|---|
| 2,394,493 | Schoenlaub | Feb. 5, 1946 |